United States Patent

Minehara et al.

(10) Patent No.: US 8,739,977 B2
(45) Date of Patent: Jun. 3, 2014

(54) COMPOSITE SEMIPERMEABLE MEMBRANE AND METHOD FOR PRODUCING THE SAME

(75) Inventors: Hiroki Minehara, Shiga (JP); Koji Nakatsuji, Shiga (JP)

(73) Assignee: Toray Industries, Inc., Tokyo (JP)

( * ) Notice: Subject to any disclaimer, the term of this patent is extended or adjusted under 35 U.S.C. 154(b) by 0 days.

(21) Appl. No.: 13/258,356

(22) PCT Filed: Mar. 18, 2010

(86) PCT No.: PCT/JP2010/054641
§ 371 (c)(1),
(2), (4) Date: Sep. 21, 2011

(87) PCT Pub. No.: WO2010/113656
PCT Pub. Date: Oct. 7, 2010

(65) Prior Publication Data
US 2012/0024778 A1    Feb. 2, 2012

(30) Foreign Application Priority Data

Mar. 31, 2009   (JP) ................................. 2009-085774

(51) Int. Cl.
*B01D 39/14*        (2006.01)
(52) U.S. Cl.
USPC .............. 210/500.28; 210/500.1; 210/500.21; 210/500.27; 210/500.34; 210/500.41; 427/487
(58) Field of Classification Search
None
See application file for complete search history.

(56) References Cited

U.S. PATENT DOCUMENTS

| | | |
|---|---|---|
| 2002/0061432 A1 | 5/2002 | Nakano et al. |
| 2003/0144450 A1 | 7/2003 | Jacob et al. |
| 2004/0038105 A1 | 2/2004 | Hennige et al. |
| 2004/0101760 A1 | 5/2004 | Kerres et al. |
| 2006/0194096 A1 | 8/2006 | Valle et al. |
| 2013/0032530 A1* | 2/2013 | Minehara et al. ........ 210/500.28 |

FOREIGN PATENT DOCUMENTS

| | | |
|---|---|---|
| JP | 60-64601 A | 4/1985 |
| JP | 1-180208 A | 7/1989 |
| JP | 11-310720 A | 11/1999 |
| JP | 2002-110200 A | 4/2002 |
| JP | 2004-501229 A | 1/2004 |

(Continued)

OTHER PUBLICATIONS

Junpei Miyake et al. "Hydrophilicity-controllable Microporous Hybrid Materials", Chemistry Letters, vol. 37, No. 6, (2008), pp. 580-581, The Chemical Society of Japan.

(Continued)

*Primary Examiner* — Lore Jarrett
*Assistant Examiner* — Benjamin J Behrendt
(74) *Attorney, Agent, or Firm* — Birch, Stewart, Kolasch & Birch, LLP

(57) ABSTRACT

Disclosed herein are a composite semipermeable membrane and a method for producing the same. The composite semipermeable membrane comprises a microporous support membrane and a separation functional layer provided on the microporous support membrane, wherein the separation functional layer contains a condensation product produced by condensation of at least one selected from the group consisting of ions of trialkoxysilanes each having an imidazolium group and a conjugated base of a polymer having at least one acidic group. The composite semipermeable membrane achieves excellent selective separation of divalent ions over monovalent ions, and is suitable for use in various water treatment fields such as seawater desalination and drinking water production.

7 Claims, 1 Drawing Sheet

(56) References Cited

FOREIGN PATENT DOCUMENTS

| JP | 2004-515351 A | 5/2004 |
| JP | 2005-144211 A | 6/2005 |
| JP | 2006-519287 A | 8/2006 |
| JP | 2006-244920 A | 9/2006 |
| WO | WO 01/83092 A1 | 11/2001 |
| WO | WO 02/47802 A1 | 6/2002 |
| WO | WO 2004/067611 A1 | 8/2004 |
| WO | 2006/028529 A2 | 3/2006 |

OTHER PUBLICATIONS

European Search Report dated Jul. 26, 2013 for Application No. 10 75 8432.

* cited by examiner

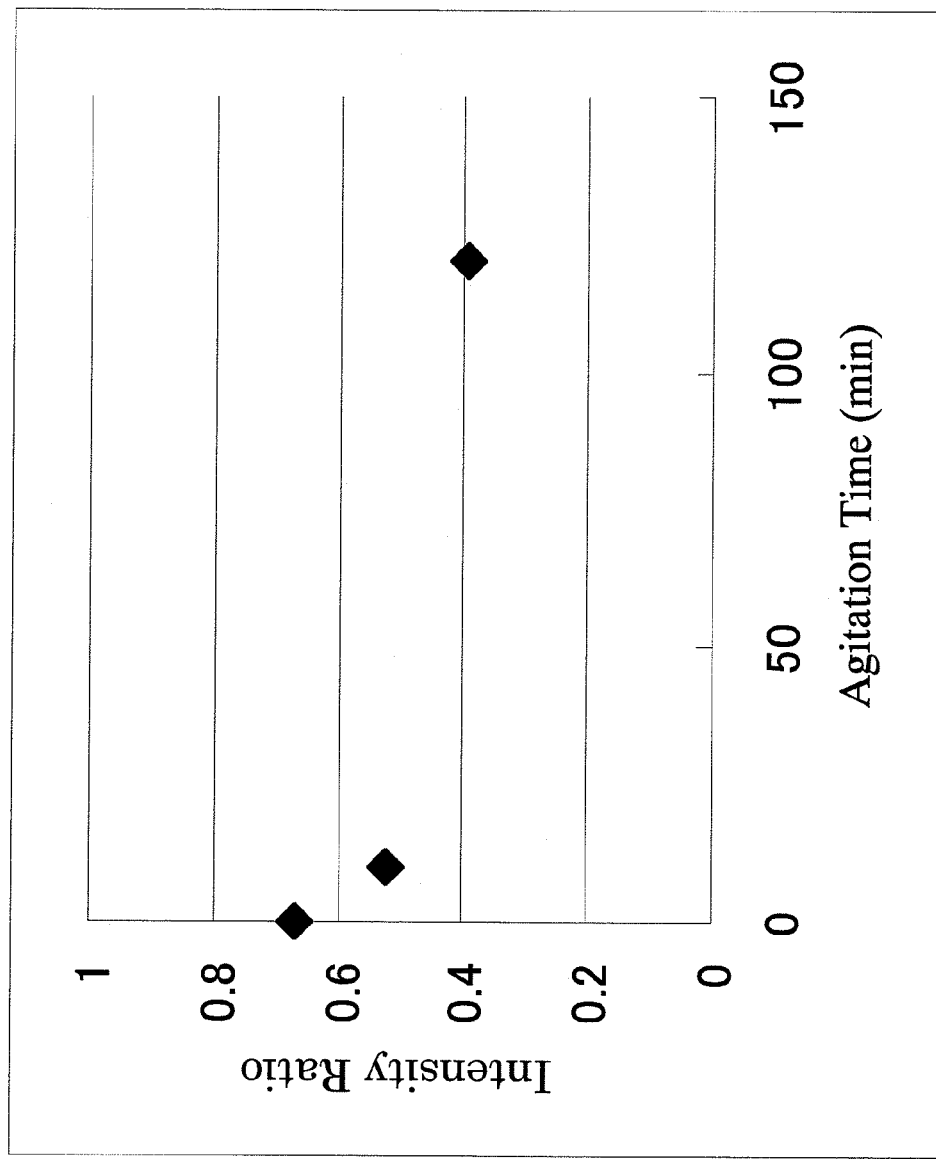

COMPOSITE SEMIPERMEABLE MEMBRANE AND METHOD FOR PRODUCING THE SAME

FIELD OF THE INVENTION

The present invention relates to a composite semipermeable membrane for selectively separating the components of a liquid mixture and a method for producing the same. More specifically, the present invention relates to a composite semipermeable membrane that includes a separation functional layer and a porous support supporting the separation functional layer and has excellent selective permeability.

BACKGROUND ART

There are various techniques for removing dissolved substances (e.g., salts) from their solvents (e.g., water), but in recent years, membrane separation processes have been actively used in water treatment fields as low-cost processes for saving energy and resources. Typical membranes for use in membrane separation processes are microfiltration membranes, ultrafiltration membranes, nanofiltration membranes (NF membranes), and reverse osmosis membranes (RO membranes).

Most of RO membranes and NF membranes are composite semipermeable membranes, and most of them are divided into two types: one has a structure in which a gel layer and a thin film layer (separation functional layer) formed by cross-linking a polymer are provided on a microporous support membrane; and the other has a structure in which a thin film layer (separation functional layer) formed by polycondensation of a monomer is provided on a microporous support membrane. As materials of these thin film layers, cross-linked polyamides are often used. Among them, a composite semipermeable membrane, such as one disclosed in Patent Document 1 or 2, produced by coating a microporous support membrane with a thin film layer made of a cross-linked polyamide obtained by the polycondensation reaction between a multifunctional amine and a multifunctional acid halide is widely used as a reverse osmosis membrane or an NF membrane due to its high water flux and high salt rejection.

In addition to salt rejection performance, ion selective separation performance can also be considered as a factor having an economic impact on water treatment using RO and NF membranes. For example, in a case where a membrane has low selective separation performance even though the membrane is required to allow the passage of monovalent ions but not of divalent ions, the concentration of ions is excessively increased on one side of the membrane and the osmotic pressure on that side of the membrane is increased. When the osmotic pressure on one side of the membrane is increased, ions increasingly try to pass through the membrane to balance the pressure on each side of the membrane, and therefore a higher pressure is required to allow desalinated water to forcibly pass through the membrane. This consequently requires a large amount of energy and therefore increases costs for water treatment.

Currently-used RO and/or NF membranes do not satisfactorily achieve selective separation of divalent ions over monovalent ions, and therefore overall salt rejection rate is high and a large osmotic pressure difference is created across the membrane. Accordingly, a higher pressure, that is, a larger amount of energy is required to achieve a practical flux. For this reason, currently-used RO and/or NF membranes are not satisfactory from the viewpoint of energy conservation.

On the other hand, in the fields of materials, organic-inorganic hybrid materials are known, which are obtained by combining a hydrophilic organic polymer and a condensation product of a silicon compound by utilizing molecular interaction (see, for example, Patent Documents 3 and 4 and Non-Patent Document 1). However, such materials have not been previously used in industrial applications.

PRIOR ART DOCUMENTS

Patent Documents
  Patent Document 1: JP-A-1-180208
  Patent Document 2: JP-A-2005-144211
  Patent Document 3: JP-A-11-310720
  Patent Document 4: WO2004/067611
Non-Patent Document
  Non-Patent Document 1: "Chemistry Letters", The Chemical Society of Japan, Vol. 37, pp. 580-581, 2008

SUMMARY OF THE INVENTION

Technical Problem

In view of the above problems, it is an object of the present invention to provide a composite semipermeable membrane that achieves excellent selective separation of divalent ions over monovalent ions and a method for producing the same.

Technical Solution

In order to achieve the above object, the present invention provides the following.

(I) A composite semipermeable membrane including:
a microporous support membrane; and
a separation functional layer provided on the microporous support membrane, wherein the separation functional layer contains a condensation product produced by condensation of at least one selected from among ions represented by the following general formula (1) and a conjugated base of a polymer having at least one acidic group:

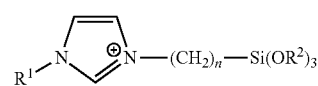

(1)

wherein n is an integer of 1 to 4 and $R^1$ and $R^2$ each represent a hydrogen atom or an alkyl group having 1 to 4 carbon atoms.

(II) The composite semipermeable membrane according to the above (I), wherein the acidic group is at least one selected from among a carboxyl group, a sulfonate group, and a phosphonate group.

(III) The composite semipermeable membrane according to the above (I) or (II), wherein the conjugated base of the polymer is obtained by polymerizing a monomer or monomer mixture containing at least one conjugated base of a compound having at least one polymerizable double bond.

(IV) A method for producing a composite semipermeable membrane including the step of forming a separation functional layer by applying, onto a microporous support membrane, a coating liquid containing a compound represented by the following general formula (2) and a monomer or monomer mixture containing at least one compound having an acidic group and at least one polymerizable double bond, irradiating it with energy rays, and drying it by heating:

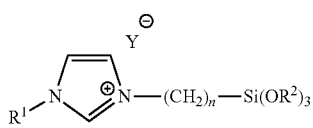

(2)

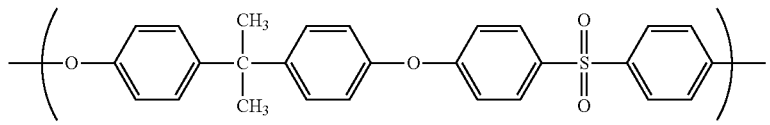

wherein n is an integer of 1 to 4, $R^1$ and $R^2$ each represent a hydrogen atom or an alkyl group having 1 to 4 carbon atoms, and $Y^-$ represents any anion.

Effects of the Invention

According to the present invention, it is possible to obtain a composite semipermeable membrane that achieves excellent selective separation of divalent ions over monovalent ions. The composite semipermeable membrane according to the present invention has excellent selective separation performance, and is therefore economically superior to conventional composite semipermeable membranes. Further, even when the composite semipermeable membrane according to the present invention is sterilized by allowing chlorine-containing feed water to pass through it continuously or intermittently, it is less likely to be degraded as compared to conventional composite semipermeable membranes.

BRIEF DESCRIPTION OF THE DRAWING

FIG. 1 is a graph showing the ratio of the absorption intensity of an absorption band at around 1034 $cm^{-1}$ to the absorption intensity of an absorption band at around 1010 $cm^{-1}$ of a composite semipermeable membrane of Example 1.

EMBODIMENTS

A composite semipermeable membrane according to the present invention is obtained by coating a microporous support membrane having virtually no separation performance with a separation functional layer (thin film layer) virtually having separation performance.

According to the present invention, the microporous support membrane has virtually no ability to separate ions and the like, and is provided to impart strength to the separation functional layer virtually having separation performance. The size and distribution of pores are not particularly limited, but the microporous support membrane preferably has, for example, uniform fine pores or fine pores that gradually become larger from one of the surfaces of the microporous support membrane on which the separation functional layer is to be formed to the other surface, wherein the size of the fine pores on the surface on which the separation functional layer is to be formed is 0.1 nm or more but 100 nm or less.

The material and shape of the microporous support membrane are not particularly limited, but the microporous support membrane is usually formed by forming a porous support on a substrate. For example, one obtained by reinforcing polysulfone, cellulose acetate, polyvinyl chloride, or a mixture of two or more of them (porous support) with fabric (substrate) mainly containing at least one selected from among polyesters and aromatic polyamides is preferably used. Among such materials for use as porous supports, polysulfone is particularly preferred due to its high chemical, mechanical, and thermal stability.

More specifically, polysulfone having a repeating unit represented by the following chemical formula is preferably used from the viewpoint of easy control of a pore size and high dimensional stability.

A microporous support membrane having a surface, most of which has fine pores with a diameter of several tens of nanometers or less can be obtained by, for example, casting an N,N-dimethylformamide (DMF) solution of the above-mentioned polysulfone to a certain thickness on a densely-woven polyester fabric or a non-woven polyester fabric and solidifying it in water by a wet process.

The thickness of the microporous support membrane has an influence on the strength of the composite semipermeable membrane and the packing density of the composite semipermeable membrane when it is used as an element. In order to obtain sufficient mechanical strength and packing density, the thickness of the microporous support membrane is preferably in the range of 50 to 300 μm, more preferably in the range of 100 to 250 μm. The thickness of the porous support of the microporous support membrane is preferably in the range of 10 to 200 μm, more preferably in the range of 30 to 100 μm.

The form of the porous support can be observed with a scanning electron microscope, a transmission electron microscope, or an atomic force microscope. In the case of observation using, for example, a scanning electron microscope, a sample for cross-section observation is prepared by peeling off the porous support from the substrate and sectioning the porous support by a freeze-fracture method. The thus prepared sample is thinly coated with platinum, platinum-palladium, or ruthenium tetrachloride, preferably with ruthenium tetrachloride and then observed with a high-resolution field-emission scanning electron microscope (UHR-FE-SEM) at an accelerating voltage of 3 to 6 kV. As the high-resolution field-emission scanning electron microscope, for example, a Hitachi S-900 electron microscope can be used. The thickness of the porous support and the diameter of surface pores of the porous support are determined from an electron micrograph obtained. It is to be noted that in the present invention, the thickness and pore size mean averages of measurements taken 5 times.

The separation functional layer virtually has separation performance and contains a condensation product produced by condensation of at least one selected from among ions represented by the above general formula (1) and a conjugated base of a polymer having at least one acidic group. It is considered that the reason why the desired effect of the present invention can be obtained is because, in this separation functional layer, a conjugated base of the acidic group is ionically bonded to an imidazolium group of the condensation product.

A method for forming the separation functional layer is not particularly limited. For example, a production method including the step of forming a separation functional layer by applying, onto a microporous support membrane, a coating liquid that contains a monomer or monomer mixture containing at least one compound having an acidic group and at least one polymerizable double bond and a compound represented by the above general formula (2), irradiating it with energy rays, and drying it by heating is preferably employed.

In the above-described production method, the coating liquid can be obtained by, for example, dissolving or dispersing a monomer or monomer mixture containing at least one compound having an acidic group and at least one polymerizable double bond and a compound represented by the above general formula (2) in a solvent, but a method for obtaining the coating liquid is not limited thereto as long as the coating liquid contains the two compounds. It is to be noted that the compound having an acidic group and at least one polymerizable double bond or the compound represented by the above general formula (2) is partially ionized in water based on its dissociation equilibrium constant.

A method for applying the coating liquid onto the microporous support membrane is not particularly limited, and the coating liquid can be applied by any well-known method such as dip coating, spin coating, spray coating, or brush coating. However, in the present invention, the coating liquid is preferably applied onto the microporous support membrane by placing an appropriate amount of the coating liquid on the microporous support membrane, covering the microporous support membrane with a film made of, for example, polyester whose degree of polymerization is not changed through contact with the solvent, and allowing it to stand. This is because the required amount of coating liquid can be reduced and operation is simple. In this case, the time during which the microporous support membrane covered with the film is allowed to stand is preferably 30 seconds to 2 minutes. Further, after the film is peeled off, the membrane is preferably fully drained without leaving droplets thereon. By fully draining the membrane, it is possible to prevent the degradation of membrane performance due to membrane defects formed in portions where droplets have remained after membrane formation. An example of a method for draining includes one in which draining is forcibly performed by blowing a gas such as nitrogen through an air nozzle.

According to the above-described production method, the composite semipermeable membrane according to the present invention is obtained by, after the application of the coating liquid onto the microporous support membrane, performing irradiation with energy rays and then heat drying. In this case, it is considered that a conjugated base of the monomer or monomer mixture containing at least one compound having an acidic group and at least one polymerizable double bond is polymerized by irradiation with energy rays. From the viewpoint of workability, the time of irradiation with energy rays is preferably 5 seconds to 15 minutes. Further, by performing heat drying, a condensation product is obtained by condensation of at least one selected from among ions represented by the above general formula (1). The temperature of heat drying is preferably 40° C. or higher, more preferably 80 to 150° C. The time of heat drying is preferably 10 minutes or longer. If the temperature of heat drying is less than 40° C. or the time of heating is less than 10 minutes, the condensation reaction of the ion of a silicon compound represented by the above general formula (1) does not satisfactorily proceed, which causes defects degrading membrane performance.

The composite semipermeable membrane obtained by the above production method is preferably made hydrophilic by immersing it in an aqueous alcohol solution for 1 to 20 minutes. This is because alcohol is soluble in water and has a high affinity for the hydrophobic surface of the membrane, and therefore the surface of the membrane can be made hydrophilic, which makes it possible to increase the amount of water produced by the membrane. As an alcohol for use in making the surface of the membrane hydrophilic, a 10 wt % aqueous isopropyl alcohol solution is generally used.

In the present invention, examples of the acidic group include, but are not limited to, a sulfonate group, a sulfinate group, a carboxyl group, a phosphonate group, a phosphinate group, a hydroxyl group, and a thiol group. Among these acidic groups, at least one selected from among a carboxyl group, a sulfonate group, and a phosphonate group is preferred in the present invention from the viewpoint of acidity and ready availability of reagents.

In the present invention, examples of the conjugated base of a polymer having at least one acidic group include conjugated bases of polyamides, polyesters, polycarbonates, polyacrylates, polyurethanes, polyethers, and polyimides which contain an acidic group as part of a repeating unit. They may be either homopolymers or copolymers, and are not particularly limited as long as they are ionically bonded to an imidazolium group of the condensation product of the ion represented by the above general formula (1). In the present invention, from the viewpoint of ease of synthesizing a conjugated base of a polymer having at least one acidic group and facilitating the control of ionic bond formation with the condensation product of the ion represented by the above general formula (1), the conjugated base of the polymer is preferably one obtained by polymerizing a monomer or monomer mixture containing at least one conjugated base of a compound having at least one polymerizable double bond.

In the present invention, examples of the polymerizable double bond include, but are not limited to, a (meth)acryloyl group, a (meth) acryloyloxy group, a (meth) acrylamide group, an allyl group, a vinyl group, and a styryl group.

In the present invention, examples of the compound having an acidic group and at least one polymerizable double bond include vinyl sulfonic acid and its salts, allyl sulfonic acid, o-styrene sulfonic acid and its salts, p-styrene sulfonic acid and its salts, m-styrenesulfonic acid and its salts, 2-vinylbenzoic acid and its salts, 3-vinylbenzoic acid and its salts, 4-vinylbenzoic acid and its salts, acrylic acid and its salts, methacrylic acid and its salts, 2-acryloyloxyethylsuccinic acid, 2-methacryloyloxyethylsuccinic acid, 3,5-diacrylamidebenzoic acid, vinylphosphonic acid, allylphosphonic acid, o-styrenephosphonic acid and its salts, p-styrenephosphonic acid and its salts, and m-styrenephosphonic acid and its salts.

From the viewpoint of obtaining a composite semipermeable membrane having high selective separation performance, the ion represented by the general formula (1) is preferably a compound whose n is 3 and $R^1$ and $R^2$ are each a methyl group, and the acidic group contained in the polymer present in the thin film is preferably at least one selected from among a carboxylic acid group, a sulfonate group, and a phosphonate group.

From the same viewpoint as described above, the amount of the ion represented by the above general formula (1) contained in the coating liquid used in the above-described production method is preferably about 10 to 90 wt %, more preferably about 10 to 50 wt % with respect to the weight of a reactive composition.

The separation functional layer of the composite semipermeable membrane according to the present invention contains a composition formed by ionic bonding between an imidazolium group contained in a condensation product produced by condensation of at least one selected from among ions represented by the general formula (1) and a conjugated base of an acidic group contained in an acidic group-containing polymer present in the condensation product.

When the composite semipermeable membrane according to the present invention is immersed in 1 mol/L hydrochloric acid for 2 hours under agitation, the acidic group-containing polymer present in the separation functional layer is eluted. Such a change can be verified by a reduction in the ratio of the intensity of an absorption band derived from the acidic group to the intensity of an absorption band (1010 cm$^{-1}$) derived from Si—O—Si stretching vibration in an infrared absorption spectrum measured by an infrared reflection absorption spectrum measuring device. The intensity ratio does not change when an infrared absorption spectrum is measured in the same manner as descried above except that the 1 mol/L hydrochloric acid is changed to pure water. This is because, in acid conditions, the acidic group in its conjugated base form is protonated and the ionic bond is broken, and therefore the acidic group-containing polymer held in the separation functional layer is eluted into the solution. By performing such an experiment, it is possible to confirm that, in the separation functional layer, an imidazolium group contained in a condensation product produced by condensation of at least one selected from among ions represented by the general formula (1) has been ionically bonded to a conjugated base of an acidic group contained in an acidic group-containing polymer present in the condensation product.

The solvent for use in the coating liquid is not particularly limited as long as it does not dissolve the microporous support membrane and is miscible with water. Examples of such a solvent include alcohols such as methanol, ethanol, 1-propanol, and 2-propanol. In order to promote condensation in the heat drying process, the coating liquid preferably contains water in an amount equimolar or more to the number of condensable functional groups contained in at least one selected from ions represented by the general formula (1) having an imidazolium group.

In the present invention, the monomer or monomer mixture is not particularly limited as long as it contains at least one compound having at least one polymerizable double bond, and may contain two or more compounds having one or more polymerizable double bonds depending on the desired characteristics of the separation functional layer or may contain a polymerization initiator, a polymerization aid, or another additive without impairing the effects of the present invention. In the production method according to the present invention, a polymerization initiator or a polymerization accelerator is preferably added to enhance polymerization reactivity. Here, the polymerization initiator and the polymerization accelerator are not particularly limited and are appropriately selected depending on the structure of the compound having one or more polymerizable double bonds and the method of polymerization.

As the polymerization initiator, any well-known one can be used without particular limitation as long as it can be dissolved in a solvent used. Examples of such a polymerization initiator include: acetophenones such as 2,2-dimethoxy-1,2-diphenylethane-1-one, 1-hydroxy-cyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one, 2-hydroxy-1-{4-[4-(2-hydroxy-2-methyl-propionyl)-benzyl]phenyl}-2-methyl-propane-1-one, 2-methyl-1-(4-methylthiophenyl)-2-morpholinopropane-1-one, 2-benzyl-2-dimethylamino-1-(4-morpholinophenyl)-butanone-1-one, 2-(dimethylamino)-2-[(4-methylphenyl)methyl]-1-[4-(4-morpholinyl)phenyl]-1-butanone, 2,4,6-trimethylbenzoyl-diphenyl-phosphineoxide, bis(2,4,6-trimethylbenzoyl)-phenylphosphineoxide, bis(η5-2,4-cyclopentadiene-1-yl)-bis(2,6-difluoro-3-(1H-pyrrole-1-yl)phenyl)titanium, 1,2-octanedione,1-[4-(phenylthio)-,2-(O-benzoyloxime)], ethanone,1-[9-ethyl-6-(2-methylbenzoyl)-9H-carbazol-3-yl]-,1-(O-acetyloxime),4-phenoxydichloroacetophenone, 4-t-butyl-dichloroacetophenone, 4-t-butyl-trichloroacetophenone, diethoxyacetophenone, 2-hydroxy-2-methyl-1-phenylpropane-1-one, 1-(4-dodecylphenyl)-2-hydroxy-2-methylpropane-1-one, 4-(2-hydroxyethoxy)-phenyl(2-hydroxy-2-propyl)ketone, 1-hydroxycyclohexylphenylketone, and 2-methyl-1-[4-(methylthio)phenyl]-2-morpholinopropane-1-one; benzoins such as benzoin, benzoin methyl ether, benzoin ethyl ether, benzoin isopropyl ether, and benzoin isobutyl ether; benzophenones such as benzophenone, benzoylbenzoic acid, 4-phenylbenzophenone, hydroxybenzophenone, and acrylated benzophenone; thioxanthones such as thioxanthone, 2-chlorothioxanthone, 2-methylthioxanthone, and 2,4-dimethylthioxanthone; and others such as 4,4-azobis(4-cyanovaleric acid), 7,7-azobis(7-cyanocaprylic acid), 6,6-azobis(6-cyano-6-cyclohexylcaproic acid), 2,2-azobis(2-methylpropionic acid), 2,2-azobis(2-ethyl-4-methoxyvaleric acid), and 2,2-azobis(2-benzylpropionic acid). As a peroxide-based compound, for example, succinic acid peroxide (PER-OYL® SA (registered trade name) manufactured by NOF CORPORATION) can be used.

As energy rays, ultraviolet rays, plasma, gamma rays, or electron rays can be used. Among them, ultraviolet rays are preferably used from the viewpoint of simplicity of a device and easy handling, and ultraviolet rays with a wavelength of 172 nm are more preferably used.

If the degree of polymerization of the polymer is too low, the polymer flows from the separation functional layer by washing with RO water after membrane formation so that defects are caused. Therefore, the concentration of the polymerization initiator to be added is preferably 5 wt % or less with respect to the weight of a reactive composition.

The composite semipermeable membrane according to the present invention produced in such a manner as described above is suitable for use as a spiral composite semipermeable membrane element formed by winding it around a tubular perforated water collecting pipe together with a feed water channel member such as a plastic net, a permeate channel member such as tricot, and if necessary, a film for enhancing pressure resistance. Further, a composite semipermeable membrane module can also be formed by housing the elements connected in series or in parallel in a pressure vessel.

Further, the composite semipermeable membrane or the element or module using it can be combined with a pump for supplying feed water thereto, a device for pretreatment of the feed water, etc. to constitute a fluid separation system. The use of such a separation system makes it possible to separate feed water into permeate as drinkable water and concentrate that has not passed through the membrane to obtain water fit for purpose. Therefore, such a separation system is expected to be used in industrial applications.

EXAMPLES

Hereinbelow, the present invention will be described in more detail with reference to the following examples, but the present invention is not limited to these examples.

It is to be noted that in the following examples, the rejection rate (Rej) of a composite semipermeable membrane is calculated by the following formula (3) and the permeation rate (Flux) of a composite semipermeable membrane is calculated by the following formula (4).

$$\text{Rej}(\%) = \{(\text{concentration of feed liquid} - \text{concentration of permeate})/\text{concentration of feed liquid}\} \times 100 \quad (3)$$

$$\text{Flux}(m^3 \cdot m^{-2} \cdot day^{-1}) = (\text{amount of permeate per day})/(\text{area of membrane}) \quad (4)$$

Example 1

A polyester non-woven fabric with dimensions of 21 cm×15 cm (air permeability: 0.5 to 1 cc/cm$^2$/sec) was prepared, and a 15.3 wt % dimethylformamide (DMF) solution of polysulfone was cast onto the non-woven fabric to a thickness of 200 μm at room temperature (25° C.) and immediately immersed in pure water and allowed to stand for 5 minutes to prepare a microporous support membrane.

2 mL of a coating liquid A prepared by mixing 3.0 parts by weight of sodium p-styrenesulfonate, 1.5 parts by weight of 3-methyl-1-(3-trimethoxysilylpropyl)imidazolium chloride, 0.24 part by weight of 2,2-dimethoxy-1,2-diphenylethane-1-one, and 95.26 parts by weight of a 65% aqueous isopropyl alcohol solution was placed on the microporous support membrane, from the surface of which droplets had been removed by nitrogen blowing. Then, the surface of the microporous support membrane was covered with a polyester film (Lumirror® manufactured by Toray Industries, Inc.) and allowed to stand for 1 minute. Then, the Lumirror® was peeled off, and droplets were removed from the surface by nitrogen blowing. Then, the surface of the microporous support membrane was irradiated with ultraviolet rays for 10 minutes using an excimer lamp UER20-172 (manufactured by USHIO INC.) that can emit ultraviolet rays with a wavelength of 172 nm. At this time, the distance between the microporous support membrane and the lamp was set to 1 cm. Then, the microporous support membrane was dried by a hot-air drier at 120° C. for 2 hours to obtain a composite semipermeable membrane.

The thus obtained composite semipermeable membrane was immersed in a 10% aqueous isopropyl alcohol solution for 20 minutes. Then, a reverse osmosis test was performed under the conditions of 0.75 MPa and 25° C. by using 500 ppm salt water adjusted to pH 6.5 as a feed liquid, and as a result, performance results shown in Table 1 were obtained. Likewise, a reverse osmosis test was performed under the conditions of 0.75 MPa and 25° C. by using a 1500 ppm aqueous $MgSO_4$ solution as a feed liquid, and the results of the test are shown in Table 1.

Pieces of 1 cm×1 cm were cut out from the composite semipermeable membrane and immersed in 1 mol/L hydrochloric acid under agitation, and infrared absorption spectra were measured after 10 minutes and 2 hours from the start of agitation. FIG. 1 is a graph obtained by plotting the ratio of the absorption intensity of a sulfonate group-derived absorption band having an absorption peak at 1034 cm$^{-1}$ to the absorption intensity of a Si—O—Si bond-derived absorption band having an absorption peak at around 1010 cm$^{-1}$ versus agitation time. FIG. 1 shows that a polymer having a sulfonate group which had been present in the composite semipermeable membrane was washed off due to the cleavage of ionic bonds by the acid, from which it was confirmed that the condensation product and a conjugated base of the acidic group-containing polymer had been ionically bonded to each other in the composite semipermeable membrane.

Example 2

A composite semipermeable membrane was produced in the same manner as in Example 1 except that 3-ethyl-1-(3-trimethoxysilylpropyl)imidazolium chloride is used instead of 3-methyl-1-(3-trimethoxysilylpropyl)imidazolium chloride. The thus obtained composite semipermeable membrane was evaluated in the same manner as in Example 1, and as a result, performance results shown in Table 1 were obtained.

Example 3

A composite semipermeable membrane was produced in the same manner as in Example 1 except that 3-butyl-1-(3-trimethoxysilylpropyl)imidazolium chloride is used instead of 3-methyl-1-(3-trimethoxysilylpropyl)imidazolium chloride. The thus obtained composite semipermeable membrane was evaluated in the same manner as in Example 1, and as a result, performance results shown in Table 1 were obtained.

Example 4

A composite semipermeable membrane was produced in the same manner as in Example 1 except that 3-methyl-1-(3-triethoxysilylmethyl)imidazolium chloride is used instead of 3-methyl-1-(3-trimethoxysilylpropyl)imidazolium chloride. The thus obtained composite semipermeable membrane was evaluated in the same manner as in Example 1, and as a result, performance results shown in Table 1 were obtained.

Example 5

A composite semipermeable membrane was produced in the same manner as in Example 1 except that the coating liquid A was changed to a coating liquid B prepared by mixing 1.9 parts by weight of sodium p-styrenesulfonic acid, 2.6 parts by weight of 1-methyl-3-(3-trimethoxysilylpropyl) imidazolium chloride, 0.15 part by weight of 2,2-dimethoxy-1,2-diphenylethane-1-one, and 94.76 parts by weight of a 65% aqueous isopropyl alcohol solution and that the process of irradiating the microporous support membrane with ultraviolet rays for 10 minutes using an excimer lamp UER20-172 (manufactured by USHIO INC.) that can emit ultraviolet rays with a wavelength of 172 nm in a state where the distance between the light exit window of the lamp and the microporous support membrane was set to 1 cm was changed to the process of irradiating the microporous support membrane with ultraviolet rays for 20 minutes at an irradiation intensity of 20 mW/cm$^2$ using a UV irradiation device (TOSCURE 752 manufactured by Harison Toshiba Lighting Corporation) that can emit ultraviolet rays with a wavelength of 365 nm. The thus obtained composite semipermeable membrane was evaluated in the same manner as in Example 1, and a result, performance results shown in Table 1 were obtained.

Comparative Example 1

A composite semipermeable membrane was produced in the same manner as in Example 1 except that 3-chloropropyltrimethoxysilane is used instead of 3-methyl-1-(3-trimethoxysilylpropyl)imidazolium chloride. The thus obtained composite semipermeable membrane was evaluated in the same manner as in Example 1, and as a result, performance results shown in Table 1 were obtained.

As can be seen from Table 1, in the case of the composite semipermeable membrane obtained in Comparative Example 1, its ability to reject monovalent ions is low, but its ability to reject divalent ions is also low. On the other hand, in the case of the composite semipermeable membranes obtained in Examples 1 and 2, the difference between the monovalent ion rejection rate and the divalent ion rejection rate is large, which indicates that these composite semipermeable membranes have high selective separation performance.

Comparative Example 2

A composite semipermeable membrane was produced in the same manner as in Example 1 except that 3-aminopropyltrimethoxysilane is used instead of 3-methyl-1-(3-trimethoxysilylpropyl)imidazolium chloride. The thus obtained composite semipermeable membrane was evaluated in the same manner as in Example 1, and as a result, performance results shown in Table 1 were obtained.

As can be seen from Table 1, the composite semipermeable membrane obtained in Comparative Example 2 is inferior in water permeability to the composite semipermeable membranes obtained in Examples 1 and 2, which indicates that the composite semipermeable membrane according to the present invention is excellent in both water permeability and selective separation performance.

Comparative Example 3

A microporous support membrane was prepared in the same manner as in Example 1. An aqueous solution containing 0.8 wt % of piperazine, 0.2 wt % of 1,3-bis(4-piperidyl) propane, 0.5 wt % of a surfactant (Newcol 271A manufactured by Nippon Nyukazai Co., Ltd.) and 1.0 wt % of trisodium phosphate was applied onto the microporous support membrane and dried by hot air at 120° C. for 40 seconds after draining by an air knife. Then, a 0.3 wt % decane solution of trimesic acid chloride was applied thereonto and then heat treated by hot air at 100° C. for 5 minutes to allow reaction to proceed. Then, an aqueous alkaline solution containing 5.0 wt % of sodium carbonate and 0.1 wt % of sodium dodecyl sulfate was applied thereonto to stop the reaction to obtain a composite semipermeable membrane. The thus obtained composite semipermeable membrane was evaluated in the same manner as in Example 1, and as a result, performance results shown in Table 1 were obtained.

As can be seen from Table 1, the composite semipermeable membrane obtained in Comparative Example 3 is inferior in selective separation of divalent ions over monovalent ions to the composite semipermeable membranes obtained in Examples 1 and 2.

TABLE 1

|  | NaCl 500 ppm | | MgSO$_4$ 1500 ppm | |
| --- | --- | --- | --- | --- |
|  | Rej. (%) | Flux (m/d) | Rej. (%) | Flux (m/d) |
| Example 1 | 13.7 | 1.10 | 82.7 | 0.96 |
| Example 2 | 15.5 | 0.87 | 71.4 | 0.91 |
| Example 3 | 5.2 | 0.10 | 60.5 | 0.10 |
| Example 4 | 37.8 | 1.15 | 86.0 | 1.13 |
| Example 5 | 8.8 | 1.52 | 61.6 | 1.03 |
| Comparative Example 1 | 13.2 | 11.04 | 2.3 | 8.70 |
| Comparative Example 2 | 22.6 | 0.60 | 82.6 | 0.60 |
| Comparative Example 3 | 82.8 | 1.22 | 99.8 | 1.15 |

INDUSTRIAL APPLICABILITY

The composite semipermeable membrane according to the present invention can be used in water treatment fields such as solid-liquid separation, liquid separation, filtration, purification, concentration, sludge treatment, seawater desalination, drinking water production, pure water production, wastewater reuse, wastewater volume reduction, and valuable resource recovery. According to the present invention, it is possible not only to provide a high-performance membrane but also to expect improvements such as energy conservation and reduction in running costs.

What is claimed is:

1. A composite semipermeable membrane comprising:
a microporous support membrane; and
a separation functional layer provided on the microporous support membrane, wherein the separation functional layer contains of a condensation product produced by condensation of at least one selected from among ions represented by the following general formula (1) and a conjugated base of a polymer having at least one acidic group:

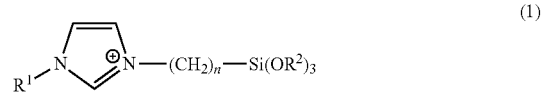

(1)

wherein n is an integer of 1 to 4 and $R^1$ and $R^2$ each represent a hydrogen atom or an alkyl group having 1 to 4 carbon atoms.

2. The composite semipermeable membrane according to claim 1, wherein the acidic group is at least one selected from among a carboxyl group, a sulfonate group, and a phosphonate group.

3. The composite semipermeable membrane according to claim 1, wherein the conjugated base of the polymer is obtained by polymerizing a monomer or monomer mixture containing at least one conjugated base of a compound having at least one polymerizable double bond.

4. A method for producing a composite semipermeable membrane comprising the step of forming a separation functional layer by applying, onto a microporous support membrane, a coating liquid containing a compound represented by the following general formula (2) and a monomer or monomer mixture containing at least one compound having an acidic group and at least one polymerizable double bond, irradiating it with energy rays, and drying it by heating:

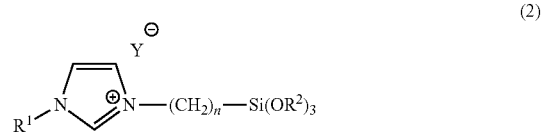

(2)

wherein n is an integer of 1 to 4, $R^1$ and $R^2$ each represent a hydrogen atom or an alkyl group having 1 to 4 carbon atoms, and $Y^-$ represents any anion.

5. The composite semipermeable membrane according to claim 2, wherein the conjugated base of the polymer is obtained by polymerizing a monomer or monomer mixture containing at least one conjugated base of a compound having at least one polymerizable double bond.

6. The composite semipermeable membrane according to claim 1, wherein the conjugated base of a polymer having at least one acidic group is selected from the group consisting of vinyl sulfonic acid and its salts, allyl sulfonic acid, o-styrene sulfonic acid and its salts, p-styrene sulfonic acid and its salts, m-styrenesulfonic acid and its salts, 2-vinylbenzoic acid and its salts, 3-vinylbenzoic acid and its salts, 4-vinylbenzoic acid and its salts, acrylic acid and its salts, methacrylic acid and its salts, 2-acryloyloxyethylsuccinic acid, 2-methacryloyloxyethylsuccinic acid, 3,5-diacrylamidebenzoic acid, vinylphosphonic acid, allylphosphonic acid, o-styrenephosphonic acid and its salts, p-styrenephosphonic acid and its salts, and m-styrenephosphonic acid and its salts.

7. The composite semipermeable membrane according to claim 2, wherein the conjugated base of a polymer having at least one acidic group is selected from the group consisting of vinyl sulfonic acid and its salts, allyl sulfonic acid, o-styrene sulfonic acid and its salts, p-styrene sulfonic acid and its salts, m-styrenesulfonic acid and its salts, 2-vinylbenzoic acid and its salts, 3-vinylbenzoic acid and its salts, 4-vinylbenzoic acid and its salts, acrylic acid and its salts, methacrylic acid and its salts, 2-acryloyloxyethylsuccinic acid, 2-methacryloyloxyethylsuccinic acid, 3,5-diacrylamidebenzoic acid, vinylphosphonic acid, allylphosphonic acid, o-styrenephosphonic acid and its salts, p-styrenephosphonic acid and its salts, and m-styrenephosphonic acid and its salts.

* * * * *